Figure 3:
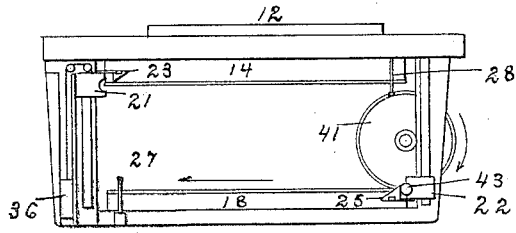

(No Model.)  2 Sheets—Sheet 1.
H. A. W. WOOD.
MECHANICAL MOVEMENT.
No. 581,839.  Patented May 4, 1897.
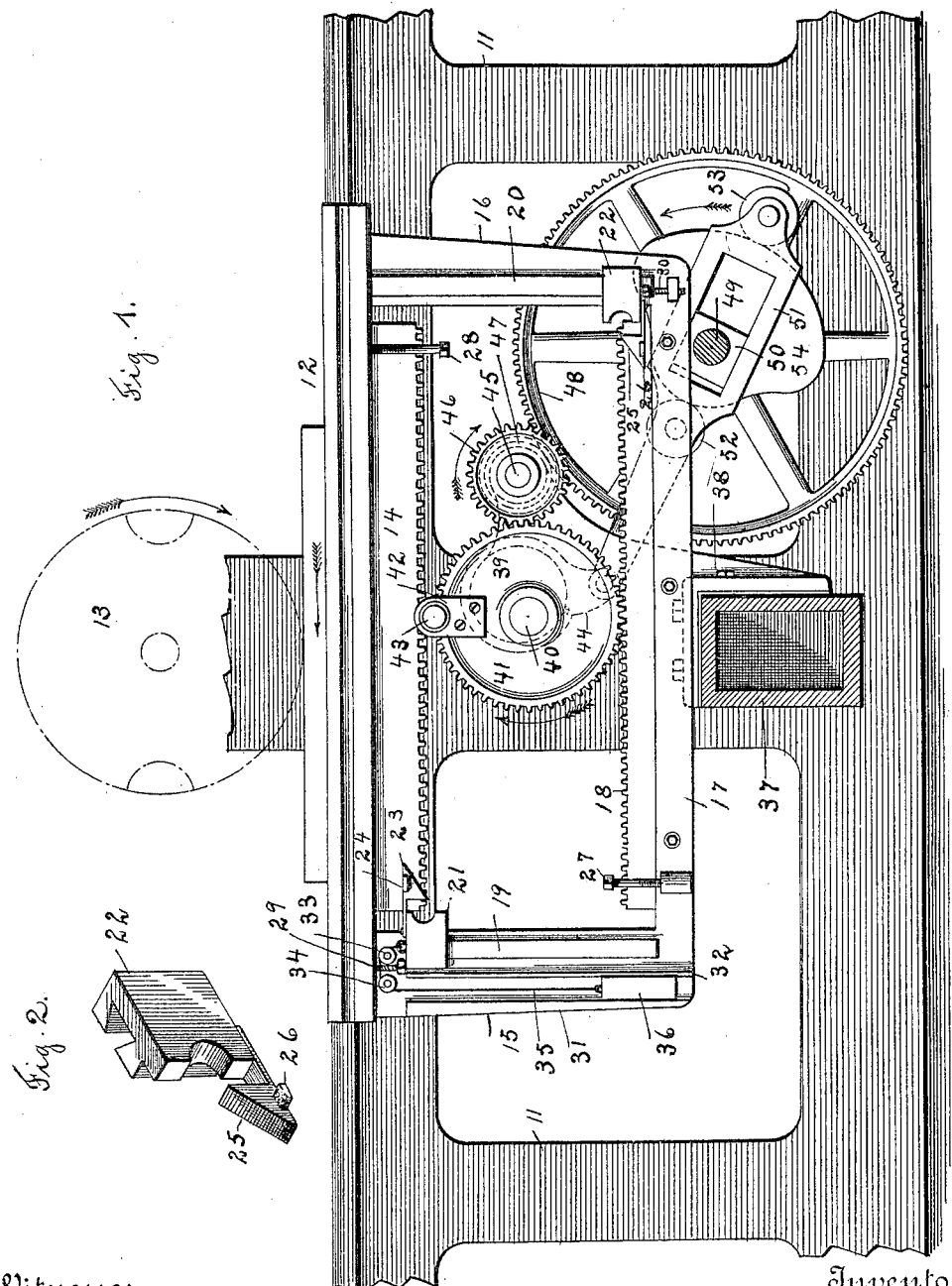
Witnesses
Chas. F. Schmelz
E. M. Healy
Inventor
H. A. W. Wood
By his Attorney
Louis W. Southgate (No Model.) 2 Sheets—Sheet 2.

H. A. W. WOOD.
MECHANICAL MOVEMENT.

No. 581,839. Patented May 4, 1897.

Witnesses
Chas. F. Schmelz
C. M. Healy

Inventor
H. A. W. Wood
By his Attorney
Louis W. Southgate

THE NORRIS PETERS CO., PHOTO-LITHO., WASHINGTON, D. C.

UNITED STATES PATENT OFFICE.

HENRY A. W. WOOD, OF NEW YORK, N. Y., ASSIGNOR TO THE CAMPBELL PRINTING PRESS AND MANUFACTURING COMPANY, OF SAME PLACE.

MECHANICAL MOVEMENT.

SPECIFICATION forming part of Letters Patent No. 581,839, dated May 4, 1897.

Application filed October 19, 1892. Serial No. 449,392. (No model.)

*To all whom it may concern:*

Be it known that I, HENRY A. WISE WOOD, a citizen of the United States, residing at New York, in the county of New York and State of New York, have invented a new and useful Improvement in Mechanical Movements, of which the following is a specification.

The aim of this invention is to produce a new and improved mechanical movement consisting of a means for converting rotary motion into rectilinearly-reciprocating motion; and to this end the invention consists of the device described and claimed in this specification and illustrated in the accompanying two sheets of drawings, in which—

Figure 1 is a sectional elevation of a printing-press with my improvement applied thereto. Fig. 2 is a detail of one of the parts I term "bearing-blocks;" and Figs. 3 to 8, inclusive, are diagrams illustrating the operation of my device.

My invention, strictly speaking, relates to a mechanical movement for converting rotary motion into rectilinearly-reciprocating motion; but my invention has been specifically devised for use in connection with the reciprocating beds of printing-presses, although the same may be applied and used in any desired connection—such as, for example, to reciprocate heavy pump-pistons or planer-tables—without departing from the scope of my invention.

I will further describe my invention as applied and used in connection with a printing-press.

A printing-press bed to secure the best results must be run at an even speed during the forward and return strokes and must be stopped and started again in the reverse direction without jar or vibration.

There are many mechanisms in use, and well known, whereby a printing-press bed is driven on its forward and backward strokes, but with most of these the bed is reversed with considerable jar.

My invention consists in the combination, with any of the old forms of driving mechanisms, which I will hereinafter term the "main" driving mechanism, of a peculiar mechanism which is adapted to reverse the movement of the bed independent of the main driving mechanism, and this latter mechanism I will hereinafter term the "reversing" mechanism. This reversing mechanism consists in the combination, with a crank element, of independent bearing members or blocks mounted so as to be vertically movable on the bed and so arranged that as the main driving mechanism becomes inoperative as the driver the crank element will periodically engage one of these bearing-blocks, and the movement of the bed will be thereby gradually decreased to a state of rest and then started and accelerated in the opposite direction. Thus the vertically-movable members, which preferably are carried by hangers or brackets attached to the bed, are engaged by suitable means—that is, by the crank element—and are moved vertically up and down these brackets, although the same move in a curved pathway relatively to a fixed point during the time they are in operation to perform that function. Thus it will be seen that the crank element is admirably adapted for this purpose, as the same will take the bed at the full speed at which it is moved by the main driving mechanism, gradually retard and bring the bed to a state of rest, and then will start and gradually accelerate the same again in the reverse direction and deliver the bed back to the main driving mechanism without jar or shock.

Referring now to the drawings and in detail, 12 represents the reciprocating bed or member, which may be mounted in the usual frames 11 in any of the usual manners common in printing-presses, and adapted to coact with the bed 12 is the impression-cylinder 13.

I have shown the simplest form of a two-revolution cylinder printing-press, it being understood, of course, that my movement may be applied and used to actuate the bed of any form of printing-press.

Attached to the under side of the bed is a rack 14, and depending from the bed are the brackets 15 and 16, which are connected together by the beam 17, which may be integral therewith, and fastened to the beam 17 is the rack 18, and the racks 14 and 18 are oppositely disposed, or face each other. Formed on or fastened to the bracket 15 is a guideway 19, and a similar guideway 20 is formed on or fastened to the bracket 16. Mounted on the guideway 19 is an independently-movable bearing block or member 21, into which the crank-pin, hereinafter described, is adapted to engage, and a similar block or member 22 is mounted on the guideway 20. The guide-block 21 carries a latch 23, which has an offset 24, and the block 22 carries a latch 25, which has an offset 26, and the offset 24 is adapted to strike against the adjustable bolt 27, and the offset 26 is adapted to strike against the adjustable bolt 28, and thereby open the latches as the blocks move vertically, as hereinafter described. The bearing-blocks are cut out on their faces, as shown, so that the crank-pin 43 will nicely fit into and turn within the same.

The mechanism on each bracket or at each end of the bed forms with the crank element a complete reversing mechanism—that is, a mechanism which will reverse the movement of a reciprocating member; and either or both arrangements—that is, an arrangement wherein the movable bearing member is kept normally in its highest position or an arrangement wherein the movable bearing member is kept normally in its lowest position—may be used wherever desired.

The bearing-block 21 is kept normally raised by means of weight 36, which is mounted on the bracket 15 between suitable guideways 31 and 32 and connected by cord 35, passing over pulleys 33 and 34, to the block 21. A screw 29 limits the upward movement of the block 21 and a screw 30 limits the downward movement of the block 32. The function of these screws is important, for by adjusting the same the bearing-blocks may be nicely set in position, so that the crank-pin 43 can come nicely into engagement with the same.

A tie-beam 37 is arranged between the main frames of the press, as shown, and on this tie-beam is fastened a bracket 38, and in this bracket is journaled an eccentric bushing 39, which has an extending arm 44. Journaled in the eccentric bushing 39 is a shaft 40, on the end of which is fastened a gear or pinion 41, and on the face of this pinion 41 is fastened a bracket 42, which carries crank-pin 43, before referred to.

Although for simplicity's sake in designing I have fastened the crank-pin to the driving-pinion, it is evident, of course, that the crank-pin could be attached to any suitable arm, which could be revolved by gearing from the main driving mechanism or could be attached to the shaft 40.

A shaft 45, which may be the main driving-shaft of the machine, is also journaled in the bracket 38, and on the end of this shaft is fastened pinion 46, which meshes with and drives the gear 41, and also fastened on the shaft 45 is a pinion 47, which meshes with and drives gear 48, fastened on the shaft 49, and on this shaft 49 is arranged a block 50, on which block 50 slides a yoke 51, which connects to the arm 44 of the eccentric bushing 39.

Arranged on the shaft 49 is a cam 54, and the yoke 51 has suitable rollers 52 and 53, which bear against the face of the cam 54, whereby as the cam turns the pinion 41 will be properly raised or lowered to alternately engage either rack 14 or 18 to drive the bed on its main forward or backward stroke.

The bolts 27 and 28 are adjustable, as shown, whereby the points at which the crank-pin 43 will be released from the bearing-blocks can be accurately determined.

Referring now to the diagrams, the operation of my device will be described.

It will be noted that when the crank-pin is brought up against either bearing-block it will force the latches 23 or 25 out of place, so that the crank-pin can properly engage the bearing-block, and that the latches will then spring back behind the crank-pin and hold the same tightly to the block.

Figure 4:
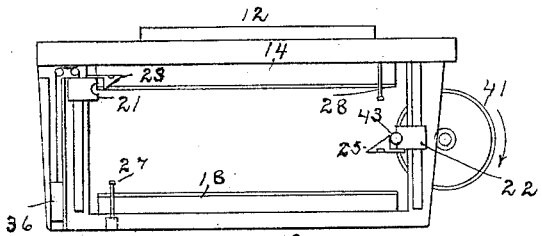

In Fig. 1 the bed is shown as moving to the left and the driving-pinion 41 in mesh with the lower rack 18. When the bed reaches the limit of its movement to the left, to which it is moved by the pinion 41, the crank-pin 43 will engage the block 22, as shown in Fig. 3. During the next quarter-revolution of the pinion 41 the bed moves still farther to the left a distance equal to the radius at which the crank-pin 43 is set on the gear 41, which is a pitch-radius of said gear. This last action will be at a gradually-decreased speed, and the inertia of the bed will be absorbed in this movement by pressing against the crank-pin, and the bed will be brought to a state of rest at its extreme left-hand position, as shown in Fig. 4. Now during the next quarter-revolution of the pinion 41 the bed will be moved to the right a distance equal to a pitch-radius of the said gear 41 and will be gradually started on its movement to the right at a speed gradually increasing from zero to the maximum by the crank-pin 43 pressing on the bearing-block 22, whereby the bed will be started in the reverse direction and will be gradually brought to its full speed. During this last half-revolution of gear 41 the bearing-block 22 will have been raised by the crank-pin, and as this movement continues the latch 25 will come against the bolt 28, and the latch 25 will thus be moved downward, so that when the block is in its highest extreme the crank-pin can leave the same; also during this last half-revolution of pinion 41 the same will be raised by the mechanism before described, so that as the crank-pin leaves the block the pinion 41 will nicely engage the end of the rack 14. During the next complete revolution of the pinion 41 the bed will be moved a distance to the right equal to a pitch-circumference of the said gear 41 and the parts will be brought to the position shown in Fig. 6, when the crank-pin will engage the block 21. Now during the next quarter-revolution of the pinion 41 the bed will be moved still farther to the right a distance equal to the pitch-radius of the gear 41 at a speed gradually decreasing from the maximum to zero, and the inertia of the bed will be absorbed by the crank-pin, and the bed will be brought to a state of rest at its right-hand extreme, or the parts will assume the position shown in Fig. 7. Now during the next quarter-revolution of the pinion 41 the bed will be gradually started back on its movement to the left at a speed commencing at zero and gradually increasing to the maximum, and during this last half-revolution of pinion 41 the same will be lowered to engage the rack 18, and when the block 21 is moved to its lowest position the latch 23 will be opened and the pinion 41 will nicely engage with the rack 18. Now during the next complete revolution of the pinion 41 the bed will be moved a pitch-circumference to the left by the pinion 41 and the parts will be brought back to assume the position shown in Fig. 3. Thus the main movement of the bed in either direction is a pitch-circumference, and this speed is uniform, and the reversing takes place at each end by a half-turn of the pinion 41.

Figure 5:
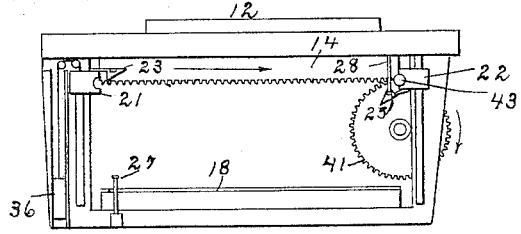
Figure 6:
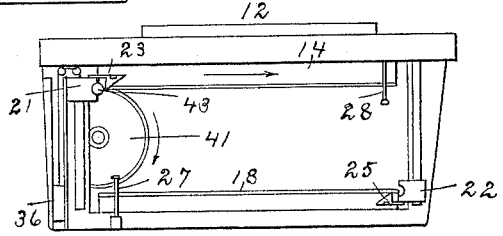
Figure 7:
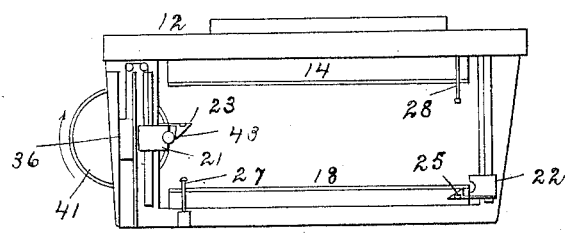
Figure 8:
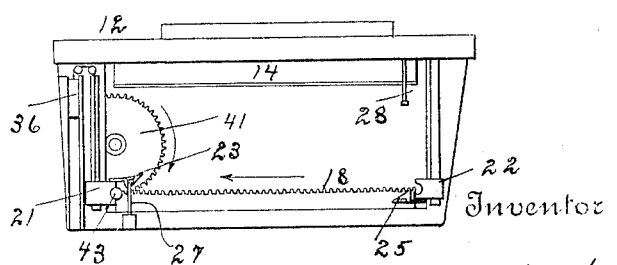

As soon as the block 22 is released, as shown in Fig. 5, the same will drop to assume its normal position, and as soon as the block 21 is released, as shown in Fig. 8, the block will be pulled up by weight 36 to assume its normal position.

The pinion 41, as before described, makes three complete revolutions for each cycle, and the movement of the bed by its main driving mechanism is a pitch-circumference of the pinion 41, and the gradual reversing movement in either direction is a pitch-radius, whereby the entire movement of the bed in either direction is a pitch-circumference of the gear 41 plus a pitch-diameter. It will be seen that by lengthening the racks and bed this could be increased to any number of pitch-circumferences plus a pitch-diameter.

The latches used on the bearing-blocks are not absolutely necessary, as it will be seen that the inertia of the bed is retarded by the movement of the crank-pin in one direction, whereby the bed will push on the crank-pin through one of the bearing-blocks during the gradual retardation of the bed, and that the bed is started again in the opposite direction by the crank-pin pushing on the bearing-block. Thus in the normal operation of the machine the strain all comes against the block from the crank-pin and no strain comes on the latches; but it is preferred to use the latches, so that the crank-pin will be kept nicely in engagement with the bearing-blocks, and so that if the bed should tend to move or get away from the crank-pin the latch will hold the crank-pin firmly to the bearing-block, and so that if the machine should happen to be stopped while the same is on its reversing movement the machine could be started up again without deranging the mechanism.

It will also be seen that the vertical movement given to the pinion 41 by the eccentric bushing will not effect the reversing movement, because the vertical movement will simply raise or lower the blocks 21 and 22 without effecting the horizontal movement of the bed.

It also will be seen that each bearing member or block 21 or 22 when engaged by the crank mechanism will move relatively or up and down on its respective bracket, but that this movement will be in a curved pathway considered with respect to a fixed point or line, for as the bearing block or member is moved up and down on its bracket the same will have a horizontal motion due to the movement of the bed during the reversing period.

Thus it will be seen that my invention consists in the combination of the moving member with any desired mechanism to give the same its main reciprocation and a peculiar reversing mechanism; and the details and arrangement of this reversing mechanism and gearing herein shown and described may be greatly varied by a skilled mechanic without departing from the scope of my invention as expressed in the claims.

Having thus fully described my invention, what I claim, and desire to secure by Letters Patent, is—

1. The combination of the reciprocating bed or member, with mechanism for reciprocating the same, and a reversing mechanism comprising a crank element, and an independently-movable bearing member carried by the bed, with which said crank element is adapted to periodically engage to reverse the movement of the bed, substantially as described.

2. The combination of the reciprocating bed or member, with mechanism for reciprocating the same, and a reversing mechanism consisting of a crank element, and independently-movable bearing members carried by the bed, with which said crank element is adapted to periodically engage to reverse the movement of the bed in either direction, substantially as described.

3. The combination of the reciprocating bed or member, with a rack-and-pinion mechanism adapted to reciprocate the same, and a reversing mechanism comprising a crank element, and an independently-movable bearing member carried by the bed, with which said crank element is adapted to periodically engage to reverse the movement of the bed, substantially as described.

4. The combination of the reciprocating bed or member with a rack-and-pinion mechanism adapted to reciprocate the same, and a reversing mechanism consisting of a crank element, and independently-movable bearing members carried by the bed, with which said crank element is adapted to periodically engage to reverse the movement of the bed, substantially as described.

5. The combination of the reciprocating bed or member, with a rack-and-pinion mechanism for reciprocating the same, and a reversing mechanism comprising a crank element, and an independently-movable bearing-block, carried by the bed, with which said crank element is adapted to periodically engage to reverse the movement of the bed when the rack-and-pinion mechanism is becoming inoperative as the driver, substantially as described.

6. The combination of the reciprocating bed or member, with a rack-and-pinion mechanism adapted to reciprocate the same, and a reversing mechanism consisting of a crank element, and independently-movable bearing-blocks, carried by the bed, with which said crank element is adapted to periodically engage to reverse the movement of the bed in either direction, when the rack-and-pinion mechanism is becoming inoperative as the driver, substantially as described.

7. The combination of the reciprocating bed or member having two racks, with a pinion adapted to alternately engage said racks to give the bed its main reciprocation, said pinion carrying a crank-pin, and an independently-movable bearing-block carried by the bed, with which said crank-pin is adapted periodically to engage to reverse the movement of the bed, substantially as described.

8. The combination of the reciprocating bed or member having two racks, with the pinion adapted to alternately engage said racks, and, thereby, give the bed its main reciprocation, of a crank-pin carried by said pinion, and independently-movable bearing-blocks carried by the bed, with which said crank-pin is adapted to periodically engage to reverse the movement of the bed in either direction, substantially as described.

9. The combination of the reciprocating bed or member with mechanism for reciprocating the same, and a reversing mechanism consisting of a crank element, and an independently-movable bearing-block carried by the bed, with which said crank element is adapted to periodically engage to reverse the movement of the bed, said block having a latch adapted to keep the crank element in engagement with the block, substantially as described.

10. The combination of the reciprocating bed or member, with mechanism for reciprocating the same, and a reversing mechanism consisting of a crank element, and independently-movable bearing-blocks carried by the bed, with which said crank element is adapted to periodically engage to reverse the movement of the bed in either direction, said blocks having latches adapted to keep the crank element in engagement with said blocks, substantially as described.

11. The combination of the reciprocating bed or member, with mechanism for reciprocating the same, and a reversing mechanism consisting of a crank element, and an independently-movable bearing-block carried by the bed, with which said crank element is adapted to periodically engage to reverse the movement of the bed, a latch carried by said block adapted to hold the crank-pin in engagement with the block, and a projection against which said latch is adapted to strike, as the same is vertically moved by the crank element to release said latch, substantially as described.

12. The combination of the reciprocating bed or member, with mechanism for reciprocating the same, and a reversing mechanism consisting of a crank element, and independently-movable bearing-blocks carried by the bed, with which said crank element is adapted to periodically engage to reverse the movement of the bed in either direction, of latches mounted on said blocks adapted to hold the crank element in proper engagement with said blocks, and projections adapted to strike said latches, as the blocks are vertically moved by the crank element, and to release said latches from the crank element, substantially as described.

13. The combination of the reciprocating bed or member with mechanism for reciprocating the same, and a reversing mechanism consisting of a crank element, and an independently-movable bearing member carried by the bed, and normally held in one position, with which said crank element is adapted to periodically engage to reverse the movement of the bed, said member being adapted to return to its normal position when said crank element leaves said member, substantially as described.

14. The combination of the reciprocating bed or member with mechanism for reciprocating the same, and a reversing mechanism consisting of a crank element, and an independently-movable bearing member carried by the bed, with which said crank element is adapted to periodically engage to reverse the movement of the bed, the lowest position of said member, being its normal position, whereby said member will fall to its normal position when disengaged from said crank element, substantially as described.

15. The combination of the reciprocating bed or member, with mechanism for reciprocating the same, and a reversing mechanism consisting of a crank element, and an independently-movable bearing-block carried by the bed, and normally held in its highest position, with which said crank element is adapted to periodically engage to reverse the movement of the bed, the block being so arranged that the same will return to its highest position when disengaged from said crank element, substantially as described.

16. The combination with the bed of a mechanism operating to drive it throughout the principal extent of its movement in either direction, a bracket carried by the bed, a movable member carried by the bracket, and means periodically engaging said member to cause the same to simultaneously move in a curved pathway and relatively to said bracket, substantially as described.

17. The combination with the bed of a mechanism operating to drive it through the principal extent of its movement in either direction, a bracket carried by the bed, a movable member carried by the bracket, and a rotative crank element for periodically engaging said member to cause the same to simultaneously move in a curved pathway and relatively to said bracket, substantially as described.

18. The combination of the reciprocating bed or member with mechanism operating to drive it throughout the principal extent of its movement in either direction, a hanger or bracket attached to the bed at each end thereof, a movable member carried by each of said hangers, and means for alternately engaging said members to cause the same to move in a curved pathway, and relatively to said brackets, substantially as described.

19. The combination of the reciprocating bed or member, with mechanism for reciprocating the same, and a reversing mechanism consisting of a crank element, and an independently-movable bearing-block carried by the bed, and adapted to normally remain in one position, with which said crank element is adapted to periodically engage to reverse the movement of the bed, said block being adapted to return to its normal position, when disengaged from said crank element, and means for setting or adjusting the normal position of said block, whereby the crank element can accurately engage with the same, substantially as described.

20. The combination of the reciprocating bed or member with mechanism for reciprocating the same, and a reversing mechanism consisting of a crank element, and independently-movable bearing-blocks carried by the bed, with which said crank element is adapted to periodically engage to reverse the movement of the bed, the normal position of one block being at the highest extreme of its movement, and the normal position of the other block being at its lowest extreme, said blocks being adapted to return to their normal positions when disengaged from said crank element, substantially as described.

21. The combination of the reciprocating bed or member, with mechanism for reciprocating the same, and a reversing mechanism comprising a crank element, and an independently-movable bearing-block carried by the bed, with which said crank element is adapted to periodically engage to reverse the movement of the bed, and a weight as 36 adapted to normally keep said block in its raised position, substantially as described.

22. The combination of the reciprocating bed or member, with mechanism for reciprocating the same, and a reversing mechanism comprising a crank element, and independently-movable bearing-blocks carried by each end of the bed, with which said crank element is adapted to periodically engage to reverse the movement of the bed in either direction, and means for adjusting the normal position of said crank-blocks, whereby the crank element can accurately engage with said bearing-blocks, substantially as described.

In testimony whereof I have hereunto set my hand in the presence of two subscribing witnesses.

H. A. W. WOOD.

Witnesses:
LOUIS W. SOUTHGATE,
E. M. HEALY.